US008049771B2

(12) United States Patent
Ono

(10) Patent No.: US 8,049,771 B2
(45) Date of Patent: Nov. 1, 2011

(54) MULTI-BEAM IMAGE FORMING APPARATUS

(75) Inventor: Katsuhiro Ono, Hitachinaka (JP)

(73) Assignee: Ricoh Company, Ltd., Tokyo (JP)

( * ) Notice: Subject to any disclaimer, the term of this patent is extended or adjusted under 35 U.S.C. 154(b) by 659 days.

(21) Appl. No.: 12/202,641

(22) Filed: Sep. 2, 2008

(65) Prior Publication Data

US 2009/0058980 A1 Mar. 5, 2009

(30) Foreign Application Priority Data

Sep. 3, 2007 (JP) ................................ 2007-227694

(51) Int. Cl.
*B41J 2/447* (2006.01)
*G02B 26/10* (2006.01)

(52) U.S. Cl. ...................................................... 347/233

(58) Field of Classification Search .................. 347/233, 347/237, 243; 359/204.1
See application file for complete search history.

(56) References Cited

U.S. PATENT DOCUMENTS

| | | | | |
|---|---|---|---|---|
| 5,930,019 A * | 7/1999 | Suzuki et al. | .............. | 359/204.1 |
| 6,038,051 A * | 3/2000 | Suzuki et al. | .............. | 359/204.1 |
| 6,172,788 B1 * | 1/2001 | Suzuki et al. | .............. | 359/204.1 |
| 2009/0023043 A1 * | 1/2009 | Takahashi et al. | .............. | 429/34 |

FOREIGN PATENT DOCUMENTS

| | | | |
|---|---|---|---|
| JP | 6-208066 A | | 7/1994 |
| JP | 8-72308 A | | 3/1996 |
| JP | 2005-343018 | * | 12/2005 |
| JP | 2007-194055 | * | 8/2007 |
| JP | 2008-288783 | * | 12/2008 |

* cited by examiner

*Primary Examiner* — Huan Tran

(74) *Attorney, Agent, or Firm* — Crowell & Moring LLP

(57) ABSTRACT

A multi-beam image forming apparatus includes a beam generating unit 101, an optical scanner 102, an image processing unit 103 for dividing image data into several areas in a primary scanning direction, and image writing units 106 and 107 for writing an image while switching multiple laser beams in accordance with each of the areas in the primary scanning direction in a printing region based on the divided image data, wherein the image processing unit 103 judges continuity of the image data when dividing the image data, so that the image processing unit 103 divides the image data at an image data portion having continuity and transmits the divided image data to the image writing units 106 and 107. The multi-beam image forming apparatus is provided as an apparatus in which scan positions can be aligned accurately both in the primary scanning direction and the secondary scanning direction and which is suitable for wide printing.

3 Claims, 6 Drawing Sheets

MULTI-BEAM IMAGE FORMING APPARATUS

BACKGROUND OF THE INVENTION

1. Field of the Invention

The present invention relates to a multi-beam image forming apparatus for forming an image based on image data transmitted from a host apparatus or the like. Particularly it relates to a multi-beam image forming apparatus suitable for wide printing of the image.

2. Description of the Background Art

An electrophotographic image forming apparatus such as a laser printer, a digital copying machine, etc. forms an image on a sheet of paper by a method including the steps of: forming an electrostatic latent image corresponding to recorded information on a photoconductor by a laser beam output from a beam generating unit after electrostatically charging a surface of the photoconductor evenly; developing the electrostatic latent image with toner to form a toner image; transferring the toner image to a sheet of paper by using a transfer portion; and fixing the toner image by using a fixing portion.

As this type image forming apparatuses, there have been heretofore proposed various multi-beam image forming apparatuses using a polygon mirror for directing laser beams toward scan lines simultaneously to form an image. The multi-beam image forming apparatus has an advantage that an image can be formed at a high speed by use of a low-speed rotating polygon motor and a low-power semiconductor laser because an image corresponding to multiple scan lines can be formed by one surface of the polygon mirror.

Use of an ASIC as an image writing means for the image forming apparatus has become the mainstream with the recent advance of semiconductor manufacturing technology. Provision of the ASIC as a general-purpose ASIC to be used in various image forming apparatuses makes mass production and drastic cost-cutting possible.

On the other hand, there has been recently a demand for a laser beam high-definition image forming apparatus, for example, using a wide sheet of paper having a sheet size of more than 20 inches. In the case of 20 inches and 1200 dpi, 24000 dots are simply required as the number of image data in the primary scanning direction. If bit depth is taken into consideration, the number of image data increases to twice or three times. It has been necessary to design a product to use the background-art ASIC for forming such a wide image in accordance with the increase in the number of image data.

As such a wide image forming method, there is a method using the background-art ASIC effectively by dividing an image forming area into parts on a photoconductor. FIGS. 6A to 6C are schematic configuration views of optical scanners applied to the background-art image forming apparatus. In FIGS. 6A to 6C, the reference numeral 1 designates a beam generating unit; 2, a polygon mirror as a scanning unit; 3, an fθ lens; and 4, a drum-shaped photoconductor. Each of the optical scanners has at least one beam generating unit 1, at least one polygon mirror 2, and at least one fθ lens 3.

Each of the optical scanners shown in FIG. 6A and 6B has two beam generating units 1, and two polygon mirrors 2. The optical scanner shown in FIG. 6C has two beam generating units 1, and one polygon mirror 2.

The optical scanner shown in FIG. 6A is configured to rotate the two polygon mirrors 2 in the same direction so that laser beams output from the beam generating units 1 are scanned in the same direction. For this reason, scan positions of laser beams can hardly be aligned accurately in the primary scanning direction because the second scan start position needs to coincide with the first scan end position. There is another technical problem that scan positions of laser beams cannot be aligned in the secondary scanning direction unless rotations of the two polygon mirrors 2 are synchronized with each other.

As shown in FIG. 6B, the optical scanner described in JP-A-6-208066 is configured to rotate the two polygon mirrors 2 in opposite directions to scan laser beams from the center toward opposite ends. For this reason, scan positions of laser beams can be aligned easily in the primary scanning direction. There is however a technical problem that scan positions of laser beams cannot be aligned in the secondary scanning direction unless rotations of the two polygon mirrors 2 are synchronized with each other.

An optical scanner described in JP-A-8-72308 is configured to rotate two polygon mirrors 2 by one drive source to synchronize rotations of the two polygon mirrors 2 with each other. It is however practically difficult that the two polygon mirrors 2 requiring high-speed rotations are rotated simultaneously by one drive source.

As shown in FIG. 6C, another optical scanner described in JP-A-8-72308 is configured so that laser beams from two beam generating units 1 are made incident on different planes of polarization of one polygon mirror 2 and joined together in the primary scanning direction on the photoconductor 4. In this configuration, scan positions of laser beams can be aligned easily in the secondary scanning direction because only one polygon mirror 2 is provided. It is however difficult to accurately align scan positions of laser beams in the primary scanning direction because laser beams are scanned in the same direction so that the second scan start position need to coincide with the first scan end position.

In the aforementioned background-art configurations, it is technically difficult to align scan positions accurately though rotations of two polygon mirrors need to be synchronized with each other. Even when only one polygon mirror is provided, there is a technical problem that it is difficult to align scan positions accurately in the primary scanning direction because laser beams from two beam generating units are scanned in the same direction.

SUMMARY OF THE INVENTION

In order to solve the problems in the background art, an object of the present invention is to provide a multi-beam image forming apparatus in which scan positions can be aligned accurately both in the primary scanning direction and the secondary scanning direction and which is suitable for wide printing.

To achieve the foregoing object, in accordance with a first aspect of the present invention, there is provided a multi-beam image forming apparatus including: an optical scanner which has a beam generating unit for generating multiple laser beams, and a scanning unit for scanning the multiple laser beams simultaneously; an image processing unit which divides image data into areas in a primary scanning direction; and image writing units which write an image while switching the multiple laser beams in accordance with each of the areas in the primary scanning direction in a printing region based on the image data divided by the image processing unit.

In the first aspect of the invention, the image processing unit judges continuity of the image data when dividing the image data, so that the image processing unit divides the image data at an image data portion having continuity and transmits the divided image data to the respective image writing units.

According to a second aspect of the invention, there is provided a multi-beam image forming apparatus according to the first aspect, wherein the image processing unit has: line memories which store the image data before dividing; a latch circuit which temporarily holds the image data stored in the line memories; a recording medium which stores an image pattern used for judging whether the image data have continuity or not; and a comparison circuit which compares an image pattern of the image data held in the latch circuit with the image pattern stored in the recording medium and outputs a dividing signal when the comparison circuit makes a decision that the image data have continuity.

According to a third aspect of the invention, there is provided a multi-beam image forming apparatus according to the first aspect, wherein the judgment of continuity of the image data results in a decision that the image data have continuity when several white dots are lined continuously.

According to the invention, displacement in scan position in the secondary scanning direction can be eliminated because the invention is made up of one beam generating unit and one scanning unit. Moreover, even when displacement occurs in scan position in the primary scanning direction, the displacement can be made inconspicuous because the timing of dividing image data can be changed. In addition, there is a large advantage in terms of cost because the image writing units are made up of ASICs to eliminate the necessity of producing wide-range ASICs newly.

DESCRIPTION OF THE PREFERRED EMBODIMENT

Figure 1:
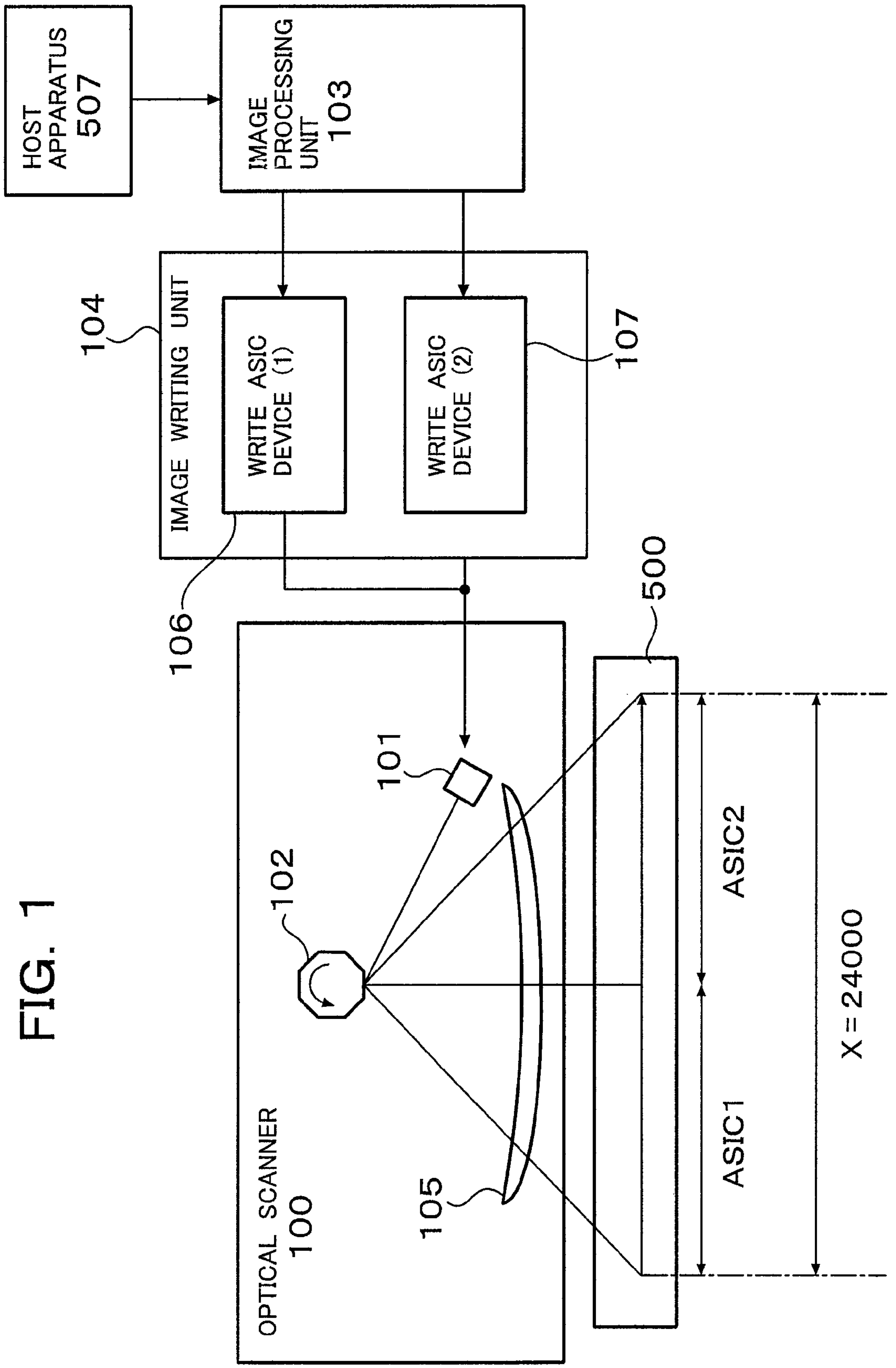
FIG. 1 is a schematic configuration view of a multi-beam image forming apparatus having an optical scanning system as a main body according to a basic embodiment of the present invention.

An embodiment of the present invention will be described below with reference to FIGS. 1 to 5. The schematic configuration of a multi-beam image forming apparatus having an image forming system as a main body will be described first with reference to FIG. 5.

After a drum-shaped photoconductor 500 for forming a toner image is electrostatically charged evenly by an electrostatic charging device 501, the photoconductor 500 is exposed to laser beams output from an optical scanner 502 in accordance with image data which are to be recorded and which are transmitted from a host apparatus 507 such as a host computer. In this manner, an electrostatic latent image is formed on the photoconductor 500. Then, a developing agent is fed onto the photoconductor 500 by a developing device 503, so that the electrostatic latent image is developed to a toner image.

The toner image formed on the photoconductor 500 is transferred onto a printing sheet 508 by a transfer device 504. The printing sheet 508 having the transferred toner image thereon is conveyed to a fixing device 505, so that the toner image on the printing sheet is pressure-melted and fixed onto the printing sheet 508. A part of toner which remains on the photoconductor 500 because it has not been transferred by the transfer device 504 is removed by a cleaning device 506 in preparation for next image formation.

FIG. 1 is a schematic configuration view of a multi-beam image forming apparatus having an optical scanning system as a main body according to a basic embodiment of the invention. As shown in FIG. 1, the multi-beam image forming apparatus includes an optical scanner 100 (equivalent to the optical scanner 502 in FIG. 5), an image processing unit 103, and an image writing unit 104. These constituent parts 100, 103 and 104 are connected as shown in FIG. 1. The image processing unit 103 is connected to the host apparatus 507.

The optical scanner 100 has a beam generating unit 101, a polygon mirror 102 as a scanning unit, and an fθ lens 105. The fθ lens 105 faces the photoconductor 500. The image writing unit 104 has two writing devices, that is, a write ASIC device (1) 106 and a write ASIC device (2) 107.

Figure 3A:
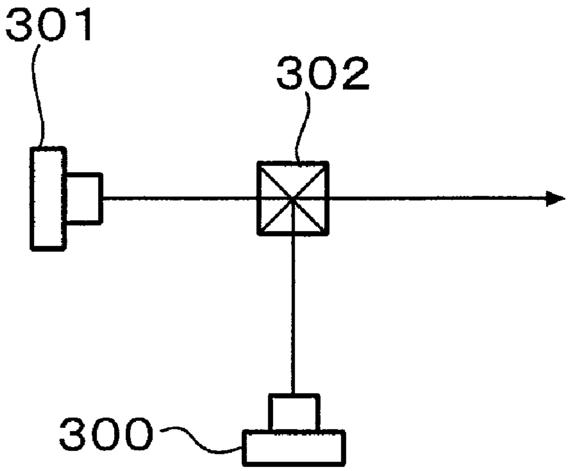
FIGS. 3A and 3B are views showing examples of configuration of a beam generating unit used in the embodiment of the invention.
Figure 3B:
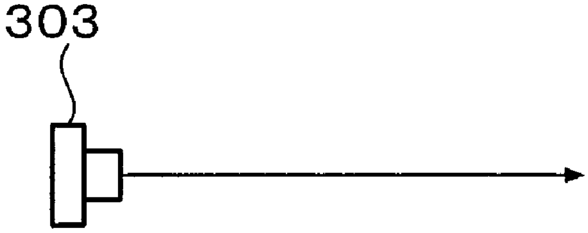

For example, the beam generating unit 101 is configured as shown in FIGS. 3A and 3B. FIG. 3A shows an example in which two semiconductor laser arrays are used. FIG. 3B shows an example in which one semiconductor laser array is used. In this embodiment, a beam generating unit which generates 20 beams is used as the beam generating unit 101.

In FIG. 3A, the reference numerals 300 and 301 designate semiconductor laser arrays (hereinafter referred to as LDAs) each of which generates 10 beams. The laser beams generated by the LDAs 300 and 301 enter a beam splitter 302, so that the laser beams are combined and output as 20 laser beams from the beam splitter 302. In FIG. 3B, the reference numeral 303 designates a semiconductor laser array which is composed of 20 laser components and which outputs 20 laser beams.

Referring back to FIG. 1, the 20 laser beams output from the beam generating unit 101 are irradiated on deflective and reflective surfaces of the polygon mirror 102 which is a scanning unit for scanning the surface of the photoconductor 500. The laser beams reflected by the polygon mirror 102 pass through an imaging unit such as the fθ lens 105, so that an image is formed on the photoconductor 500.

In FIG. 1, the reference symbol X designates the number of image data in the primary scanning direction, that is, an image forming region. In this embodiment, the image forming region X has 24000 dots. If the image forming region X is simply allocated equally to the write ASIC device (1) 106 and the write ASIC device (2) 107, the write ASIC device (1) 106 performs image writing for a region of from the first dot to the 12000th dot while the write ASIC device (2) 107 performs image writing for a region of from the 12001st dot to the 24000th dot. There is however a possibility that positional displacement will occur in a printing image at the time of switching of writing in accordance with characteristic difference between the write ASIC devices 106 and 107, image data of the 12000th dot and the 12001st dot on the turn and image data of several lines in the secondary scanning direction.

Therefore, the image processing unit 103 has a function of properly changing the dividing position of image data based on image data of ambient dots so that positional displacement caused by switching of image data writing becomes inconspicuous in a printing image corresponding to image data to be recorded.

Figure 2:
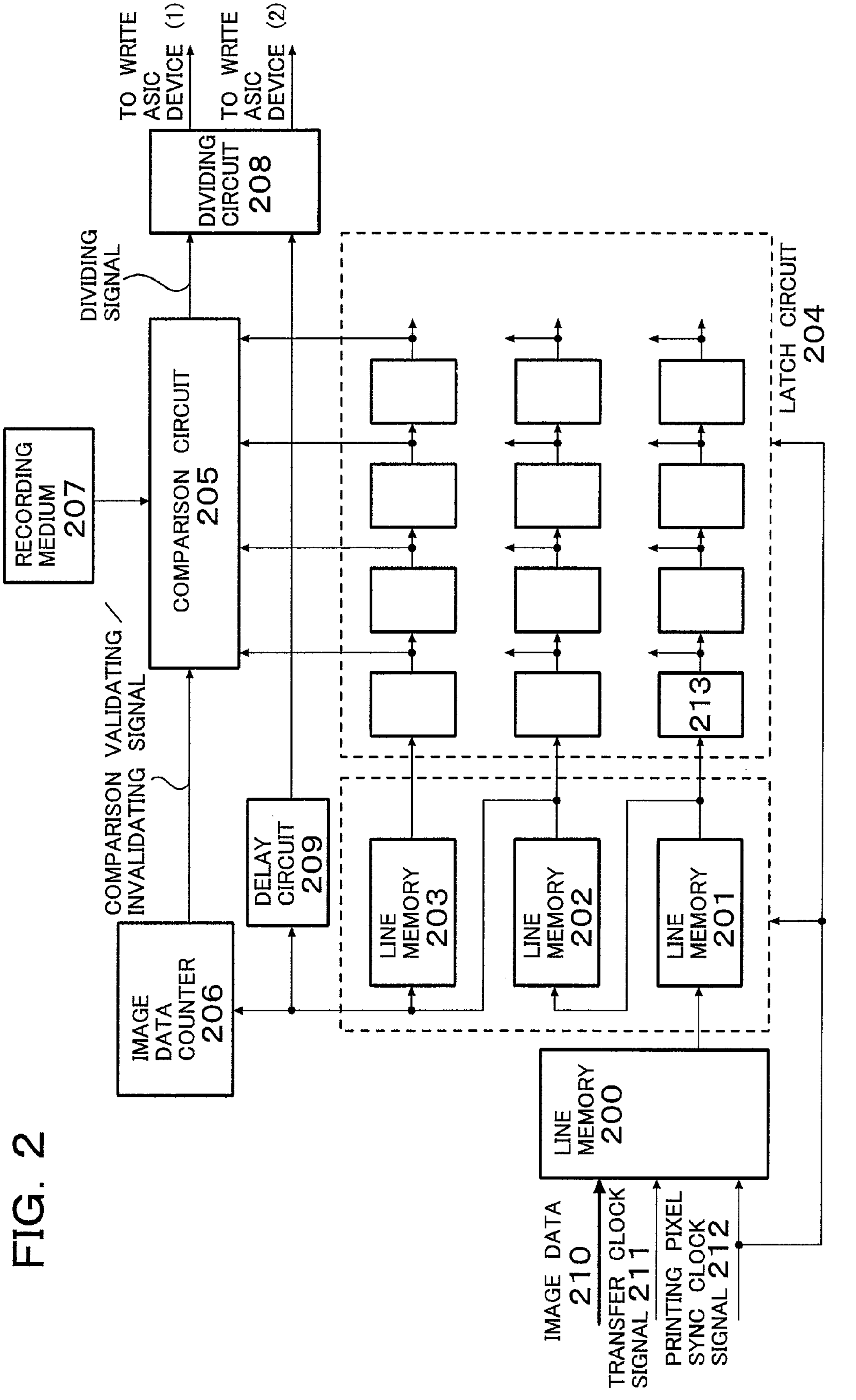
FIG. 2 is a block diagram showing the configuration of an image processing unit used in the embodiment of the invention.

FIG. 2 is a block diagram showing the configuration of the image processing unit 103. As shown in FIG. 2, the image processing unit 103 has a speed change line memory 200, a first line memory 201, a second line memory 202, a third line memory 203, a latch circuit 204, a comparison circuit 205, an image data counter 206, a recording medium 207, a dividing circuit 208, and a delay circuit 209. These constituent parts 200 to 209 are connected as shown in FIG. 2. As shown in FIG. 2, the latch circuit 204 is composed of a large number of shift registers 213 provided in accordance with the line memories 201 to 203.

The host apparatus 507 (see FIG. 1) transmits image data 210 of 20 lines per scan and a transfer clock signal 211, for example, of 20 MHz to the image processing unit 103. The image processing unit 103 having the plurality of line memories 200 to 203 writes the image data into the line memories 200 to 203 in synchronization with the transfer clock signal.

An operation sequence of the line memories 200 to 203 will be described below. First, image data of first 20 lines (called 20 lines a) are written into the speed change line memory 200 successively in synchronization with the transfer clock signal 211. The written 20 lines a are read in synchronization with a printing pixel sync clock signal 212 (for example, of 60 MHz) in a next scan. At the same time, next 20 lines (called 20 lines b) are written in synchronization with the transfer clock signal 211. The aforementioned operation is performed in accordance with each scan in order to change the speed of image data.

On the other hand, the read 20 lines a are written into the line memory 201 in synchronization with the printing pixel sync clock signal 212. In a further next scan, the 20 lines a are read from the line memory 201 and 20 lines b are written into the line memory 201. In a further next scan, 20 lines c are written into the line memory 201 while the 20 lines b are read from the line memory 201, the 20 lines b are written into the line memory. 202 while the 20 lines a are read from the line memory 202, and the 20 lines a are written into the line memory 203. In this manner, repetition of data reading and data writing permits the image processing unit 103 to hold image data of 60 lines at all times.

The data of 60 lines read from the group of line memories 201 to 203 are transferred to the latch circuit 204. The latch circuit 204 shifts the image data to the right in FIG. 2 in synchronization with the printing pixel sync clock signal 212 and holds the data up to next synchronization timing of the printing pixel sync clock signal 212. The number of image data held in the primary scanning direction is decided based on the number of latches in the latch circuit 204. For example, assuming now that the number of image data held is 60, then image data of 60 dots in the primary scanning direction and 60 dots in the secondary scanning direction are transmitted, as information for making a decision for dividing image data, to the comparison circuit 205.

The image processing unit 103 has the image data counter 206 for counting the number of image data in synchronization with the printing pixel sync clock signal 212. In this embodiment, the image processing unit 103 validates the comparison circuit 205 when the number of counts reaches 11970, and the image processing unit 103 invalidates the comparison circuit 205 when the number of counts reaches 12030.

When the comparison circuit 205 is validated, the comparison circuit 205 compares the image pattern with an image pattern stored in advance in the recording medium 207 while shifting the image data dot by dot in the primary scanning direction to judge whether the image data have continuity or not. When the comparison circuit 205 makes a decision that the image data have continuity, the comparison circuit 205 outputs a dividing signal for dividing image data to the dividing circuit 208 so that image data transfer is changed from the write ASIC device (1) 106 to the write ASIC device (2) 107. When the comparison circuit 205 makes a decision that the image data have no continuity, the comparison circuit 205 outputs a dividing signal for dividing image data at the time of the 12000th dot as the count number so that image data are allocated equally to the write ASIC device (1) 106 and the write ASIC device (2) 107.

The image processing unit 103, which has the delay circuit 209 for delaying image data to absorb the time required for judgment of continuity, eliminates the time lag between the image data and the dividing signal. In this embodiment, the delay circuit 209 is provided as a circuit for delaying image data for 60 dots.

Figure 4:
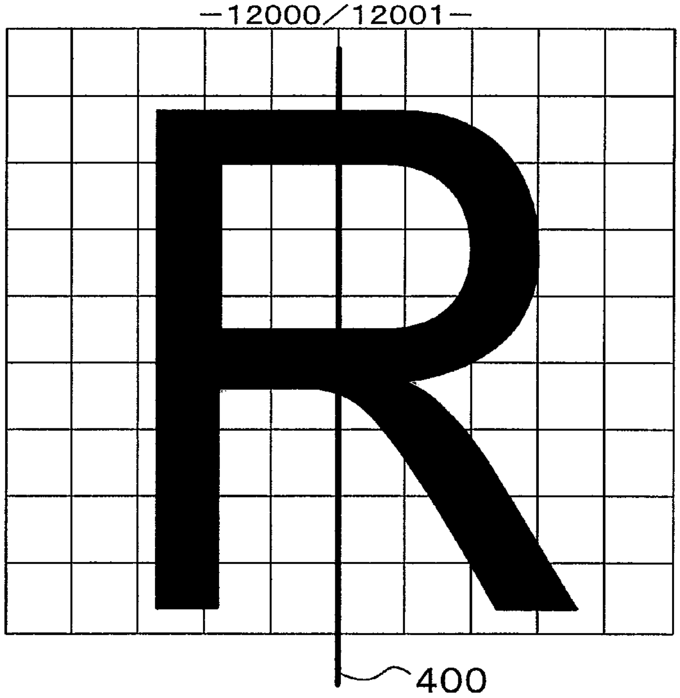
FIG. 4 is an image view showing image data dividing position in the embodiment of the invention.
Figure 4:
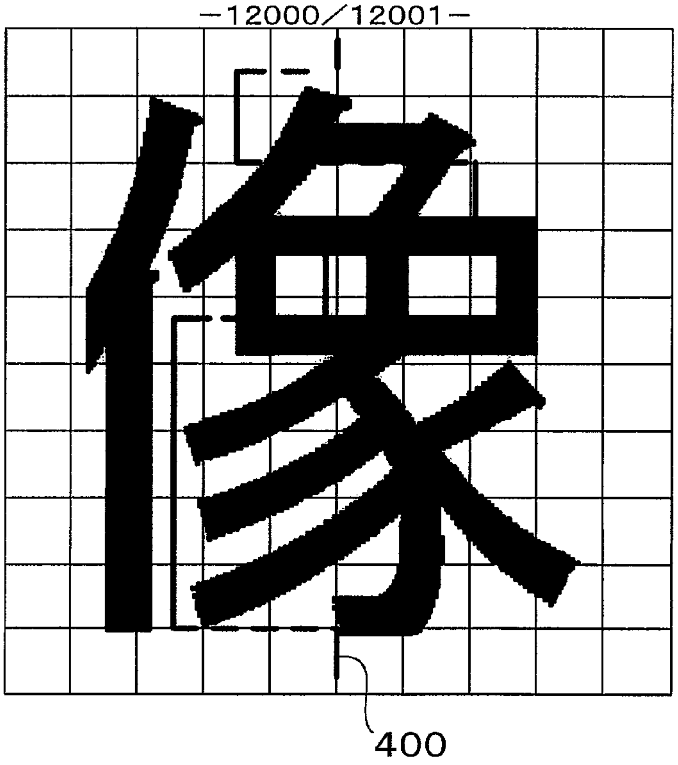
Figure 5:
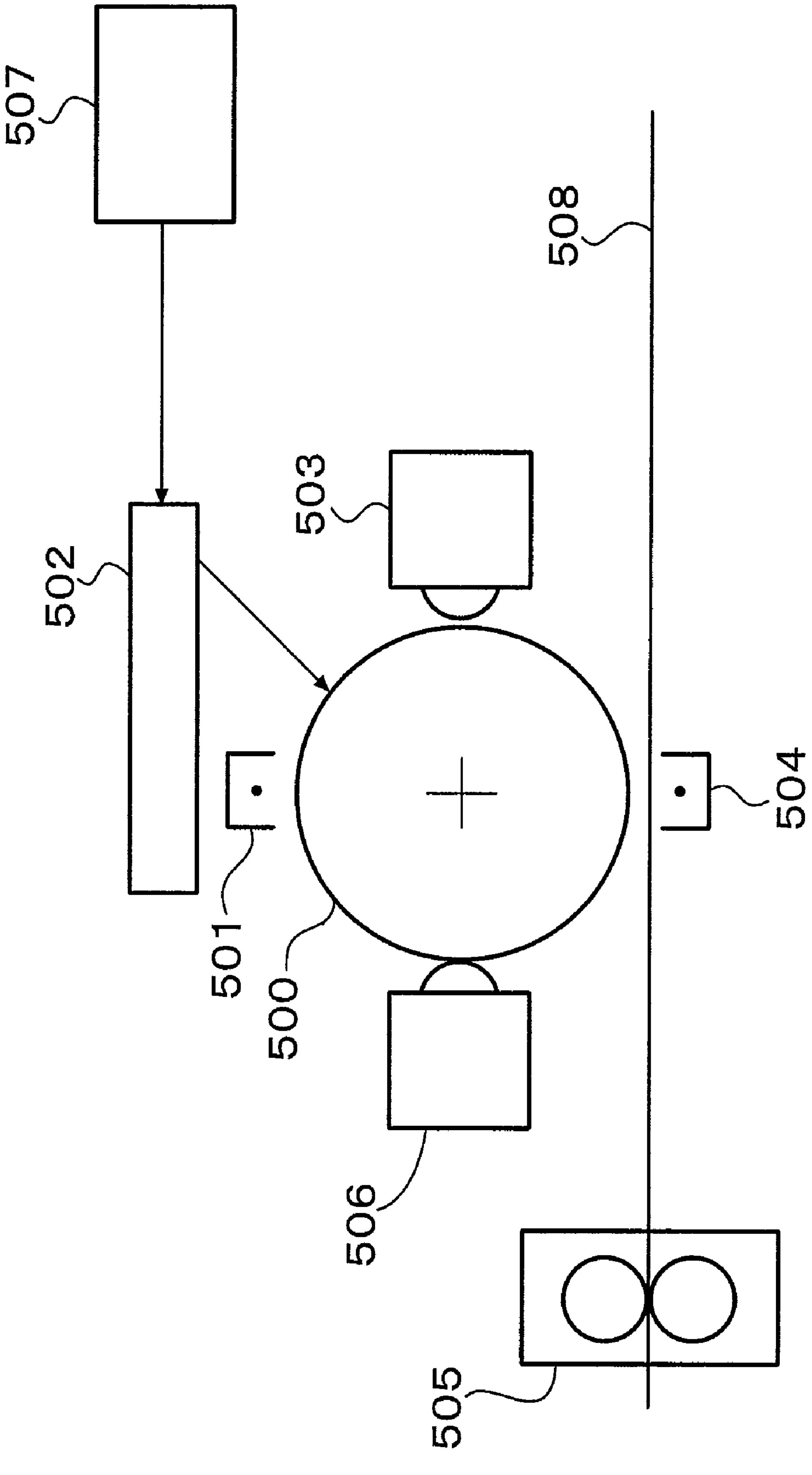
FIG. 5 is a schematic configuration view of the multi-beam image forming unit according to the embodiment of the invention.
Figure 6A:
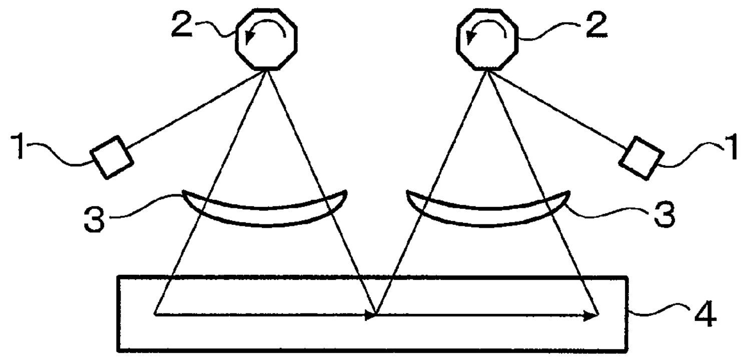
FIGS. 6A to 6C are views showing examples of an optical scanning system according to the background art.
Figure 6B:
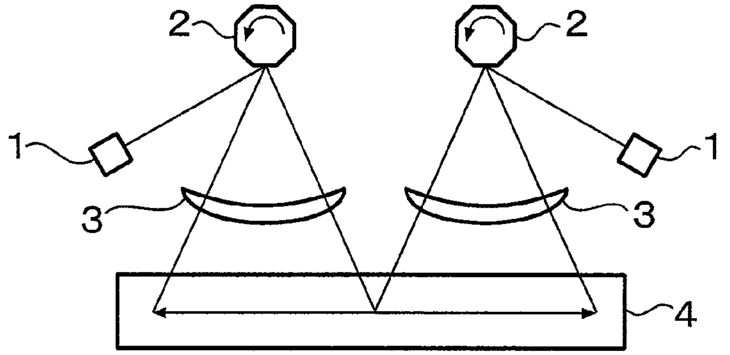
Figure 6C:
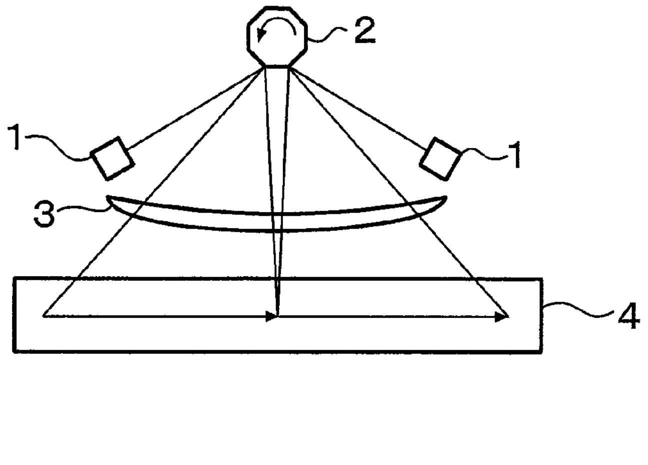

FIG. 4 shows an image example in which image data dividing is performed based on image data to be printed in the condition that an ordinary boundary of the dividing position of image data is set between the 12000th dot and the 12001st dot as described above.

A character "R" and a Japanese character "像" are shown in this example. Whether or not the image data have continuity is judged in the condition that each character is divided by 60 dots in the primary scanning direction and by 60 dots in the secondary scanning direction (FIG. 4 shows a state in which the number of divisions is small for the sake of simplification). When several white or black dots (e.g. about 5 to 10 dots) are continuous, a decision is made that the image data have continuity. Since there is a possibility that white stripes will occur when the dividing position is decided based on black dots, and since decision of the dividing position based on white dots has an advantage that displacement becomes inconspicuous, the dividing position in this embodiment is decided based on white dots. The line 400 in FIG. 4 is a dividing line by which the image data are divided.

In the character "R" shown in FIG. 4, image data dividing in the ordinary boundary is used because the character "R" is high in both continuity of black dots and continuity of write dots. On the other hand, in the Japanese character "像", the dividing position of image data is set at a high-continuity position as shown in FIG. 4 so that image displacement caused by switching in the image writing unit can be made inconspicuous, because the Japanese character "像" is low in continuity in the ordinary boundary. Incidentally, the position of the vertical line attached to each of the characters "R" and "像" expresses the dividing position of image data in FIG. 4.

What is claimed is:

1. A multi-beam image forming apparatus comprising:

an optical scanner which has a beam generating unit for generating multiple laser beams, and a scanning unit for scanning the multiple laser beams simultaneously;

an image processing unit which divides image data into areas in a primary scanning direction; and image writing units which write an image while switching the multiple laser beams in accordance with each of the areas in the primary scanning direction in a printing region based on the image data divided by the image processing unit;

wherein the image processing unit judges whether or not the image data have continuity when dividing the image data, so that the image processing unit divides the image data at an image data portion having continuity and transmits the divided image data to the respective image writing units.

2. A multi-beam image forming apparatus according to claim 1, wherein the image processing unit has:

line memories which store the image data before dividing;

a latch circuit which temporarily holds the image data stored in the line memories;

a recording medium which stores an image pattern used for judging whether the image data have continuity or not; and a comparison circuit which compares an image pattern of the image data held in the latch circuit with the image pattern stored in the recording medium and outputs a dividing signal when the comparison circuit makes a decision that the image data have continuity.

3. A multi-beam image forming apparatus according to claim 1, wherein the judgment of continuity of the image data results in a decision that the image data have continuity when several white dots are lined continuously.

* * * * *